US007634286B2

(12) United States Patent
Dunko

(10) Patent No.: US 7,634,286 B2
(45) Date of Patent: Dec. 15, 2009

(54) DEVICE AND METHOD INCLUDING SECONDARY ACTUATOR FOR PUSH-TO-TALK APPLICATION

(75) Inventor: Gregory A. Dunko, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 476 days.

(21) Appl. No.: 11/380,685

(22) Filed: Apr. 28, 2006

(65) Prior Publication Data
US 2007/0254606 A1    Nov. 1, 2007

(51) Int. Cl.
*H04W 4/10* (2009.01)
(52) U.S. Cl. .................................. 455/518; 455/509
(58) Field of Classification Search .................. None
See application file for complete search history.

(56) References Cited

U.S. PATENT DOCUMENTS

| 2005/0245203 | A1 | 11/2005 | Vance ........................... 455/79 |
| 2006/0040689 | A1 | 2/2006 | Yoon et al. ................... 455/518 |
| 2006/0046755 | A1 | 3/2006 | Kies ............................ 455/518 |
| 2006/0082641 | A1* | 4/2006 | Rengaraju et al. ........ 348/14.02 |

FOREIGN PATENT DOCUMENTS

| EP | 1 575 316 | 9/2005 |
| WO | 2005/062569 | 7/2005 |
| WO | 2005/086521 | 9/2005 |
| WO | 2006/022811 | 3/2006 |
| WO | 2006/023963 | 3/2006 |

OTHER PUBLICATIONS

International Preliminary Report on Patentability for International Application No. PCT/US2006/040080 dated Aug. 5, 2008.
Sesnick, Cindy, "Version 2.0 User Guide", Internet Citation, Jun. 2000, pp. 1-15.
Bisdikian, et al., "A Web-based MultiMedia Collaboration System", Conference Proceedings Document, Jun. 1997, pp. 55-60.
International Search Report and Written Opinion for International Application No. PCT/US2006/040080 dated Mar. 9, 2007.

* cited by examiner

*Primary Examiner*—Philip J Sobutka
(74) *Attorney, Agent, or Firm*—Renner, Otto, Boisselle & Sklar, LLP

(57) ABSTRACT

A portable communication device includes a first push-to-talk (PTT) actuator, a second PTT actuator and a PTT processor in operative communication with the first PTT actuator and the second PTT actuator. The PTT processor requests control of a PTT communication floor in response to user actuation of the first PTT actuator, and triggers a secondary action to be performed while having control of the PTT communication floor in response to user actuation of the second PTT actuator. The portable communication device includes enhanced user control and interface options for PTT communication sessions.

14 Claims, 4 Drawing Sheets

US 7,634,286 B2

DEVICE AND METHOD INCLUDING SECONDARY ACTUATOR FOR PUSH-TO-TALK APPLICATION

TECHNICAL FIELD OF THE INVENTION

The present invention relates generally to portable communication devices, and, more particularly, to a portable communication device and method including a secondary actuator for triggering a secondary action during a push-to-talk (PTT) session.

DESCRIPTION OF RELATED ART

In recent years, portable communication devices, such as mobile phones, personal digital assistants, mobile terminals, etc., continue to grow in popularity. As the popularity of portable communication devices continues to grow, today's wireless landscape is rapidly changing as mobile phones and networks are being enhanced to provide services beyond voice services. The wireless industry is experiencing a rapid expansion of mobile data services. The expansion of mobile data services is driven by continued technological advancement, as well as by the demand from users of portable communication devices. Portable communication devices are appealing to users because of their capability to serve as powerful communication and data service tools.

One advance in wireless technology includes direct radio communication capability between two or more portable communication devices. This direct radio communication is commonly referred to as "walkie-talkie" or "push-to-talk" (PTT) communications. PTT communications allows a user to communicate with one or more parties or a group without dialing a destination phone number. In general, the PTT system requires a user to push and hold a button while talking, and then release the button to switch to a receive or listen mode.

SUMMARY

In view of the foregoing, a need exists for a portable communication device that includes additional mobile data services, and application programs for providing additional mobile data services, such as a portable communication device and associated application program that facilitate triggering one or more secondary actions during a push-to-talk (PTT) session.

One aspect of the invention relates to a portable communication device that includes a first push-to-talk (PTT) actuator, a second PTT actuator and a PTT processor in operative communication with the first PTT actuator and the second PTT actuator. The PTT processor requests control of a PTT communication floor in response to user actuation of the first PTT actuator, and triggers a secondary action to be performed while having control of the PTT communication floor in response to user actuation of the second PTT actuator.

According to another aspect, the secondary action includes transmitting a user-selected item of media content to at least one other portable communication device participating in a PTT communication session.

According to another aspect, the media content includes an image, a video clip, an audio clip and/or a data file.

According to another aspect, triggering a secondary action includes interfacing with an application program on the portable communication device and requesting the application program to perform a desired action.

According to another aspect, the application program includes sharing image files, video files and/or audio files.

According to another aspect, triggering a secondary action includes requesting transmission of an IP multimedia subsystem (IMS) message.

According to another aspect, the PTT processor interfaces with a media content sharing application program to transmit selected media content to a second portable communication device.

According to another aspect, the PTT processor releases control of the PTT communication floor in response to user release of the first PTT actuator.

According to another aspect, the first PTT actuator is located on a first side of the portable communication device, and the second PTT actuator is located on a second side of the portable communication device.

According to another aspect, the portable communication device is a mobile telephone.

Another aspect of the invention relates to a program stored on a machine readable medium, the program being suitable for use in a portable communication device, wherein when the program is loaded in memory in the portable communication device and executed causes the portable communication device to activate a push-to-talk (PTT) session, request control of a PTT communication floor, and trigger a secondary action to be performed while having control of the PTT communication floor.

According to another aspect, the program causes the portable communication device to requests control of a PTT communication floor in response to user actuation of a primary PTT actuator.

According to another aspect, the program causes the portable communication device to trigger a secondary action to be performed in response to user actuation of a secondary PTT actuator.

According to another aspect, the secondary action is transmitting a user-selected item of media content to at least one other portable communication device.

According to another aspect, the item of media content includes an image, a video clip, an audio clip and/or a data file.

According to another aspect, the portable communication device is a mobile phone.

According to another aspect, a portable communication device includes a memory and a processor that executes an application program that causes the portable communication device to activate a push-to-talk (PTT) session, request control of a PTT communication floor, and trigger a secondary action to be performed while having control of the PTT communication floor.

According to another aspect, a method of transmitting media content to at least one portable communication device includes activating a push-to-talk (PTT) session with at least one other portable communication device, requesting control of a PTT communication floor, and while having control of the PTT communication floor, transmitting user-selected media content to the at least one other portable communication device.

According to another aspect, the media content is an image, a video clip, an audio file or a data file.

According to another aspect, transmitting user-selected media content includes triggering a media content sharing application program to transmit the user-selected media content in response to user actuation of a secondary PTT actuator.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Figure 1:
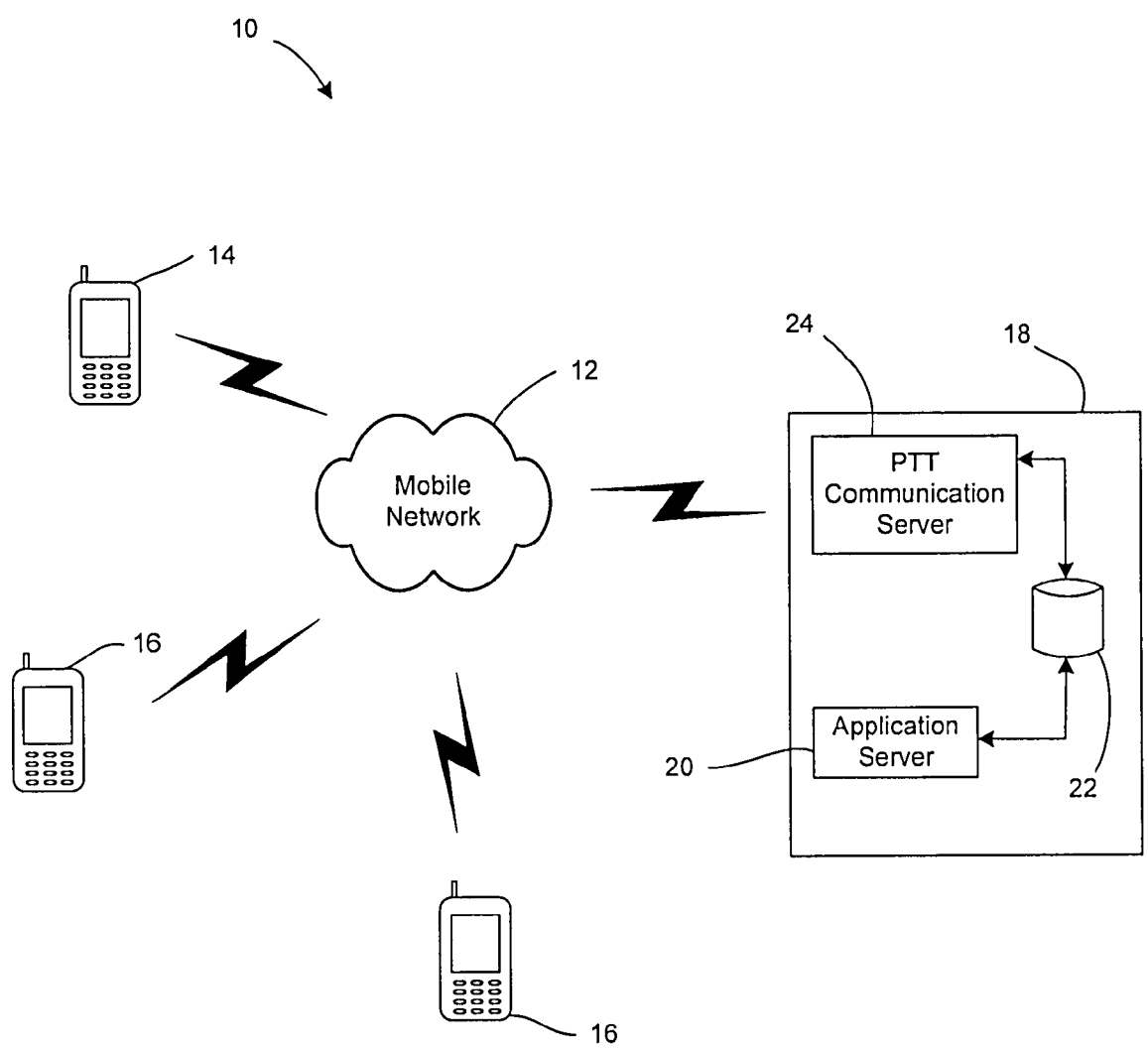
FIG. 1 is a diagrammatic illustration of a communication system that supports push-to-talk communications including a portable communication device on which aspects of the present invention are carried out.

In the detailed description that follows, like components have been given the same reference numerals regardless of whether they are shown in different embodiments of the present invention. To illustrate the present invention in a clear and concise manner, the drawings may not necessarily be to scale and certain features may be shown in somewhat schematic form.

As used herein, the term "portable communication device" includes portable radio communication equipment. The term "portable radio communication equipment", which herein after may be referred to as a mobile phone, a mobile device, a mobile radio terminal or a mobile terminal, includes all electronic equipment, including, but not limited to, mobile telephones, pagers, communicators, i.e., electronic organizers, smartphones, personal digital assistants (PDAs), or the like. While the present invention is being discussed with respect to portable communication devices, it is to be appreciated that the invention is not intended to be limited to portable communication devices, and can be applied to any type of electronic equipment capable of being used in connection with push-to-talk (PTT) communications.

Referring initially to FIG. 1, a communication system 10 includes a mobile network 12, such as a mobile cellular telephony network, that facilitates communication, such as voice communication and/or data transfer between a plurality of portable communication devices 14 and 16, such as mobile phones, mobile terminals or the like. The communication system 10 and at least two of the portable communication devices 14, 16 support PTT communications, e.g., by including a PTT application program. For purposes of the discussion contained herein, portable communication device 14 will be described in terms of initiating or activating a PTT session with portable communication devices 16. However, it will be appreciated that the method described more fully below can be carried out by any suitably equipped portable communication device, regardless of whether that device initiates a PTT session or responds to an invitation to participate in a PTT session.

The communication system 10 includes a network infrastructure 18, portions of which are used or otherwise accessed by the portable communication devices in connection with aspects of the invention. The portable communication devices 14, 16 may interact with each other and/or the network infrastructure in accordance with any suitable communication standard, including, but not limited to, Advanced Mobile Phone Service (AMPS), Digital Advanced Mobile Phone Service (D-AMPS), General Packet Radio Service (GPRS), Universal Mobile Telecommunications System (UTMS), Global System for Mobile Communications (GSM), Code Division Multiple Access (CDMA), Voice-Over IP (VoIP), Session Initiated Protocol (SIP), Wireless Local Area Network (WLAN) or the like. In other words, the communication system is shown in FIG. 1 for purposes of explaining aspects of the present invention, without limiting the invention to a particular communication system design, architecture or communication standard.

The network infrastructure 18 includes one or more application servers, which are indicated generally by the numeral 20, and a storage device 22, such as a memory for storing data accessible or otherwise usable by the application servers 18. At least one of the application servers is a push-to-talk (PTT) communication server 24. The application servers 18, including the PTT communication server 24, are computer servers that serve different functions in the communication system. As is described more fully below, one or more of the portable communication devices 14 and 16 are operable to trigger or otherwise engage in a secondary action, e.g., in response to user manipulation of a secondary actuator, while controlling the floor during a PTT communication session.

Figure 2:
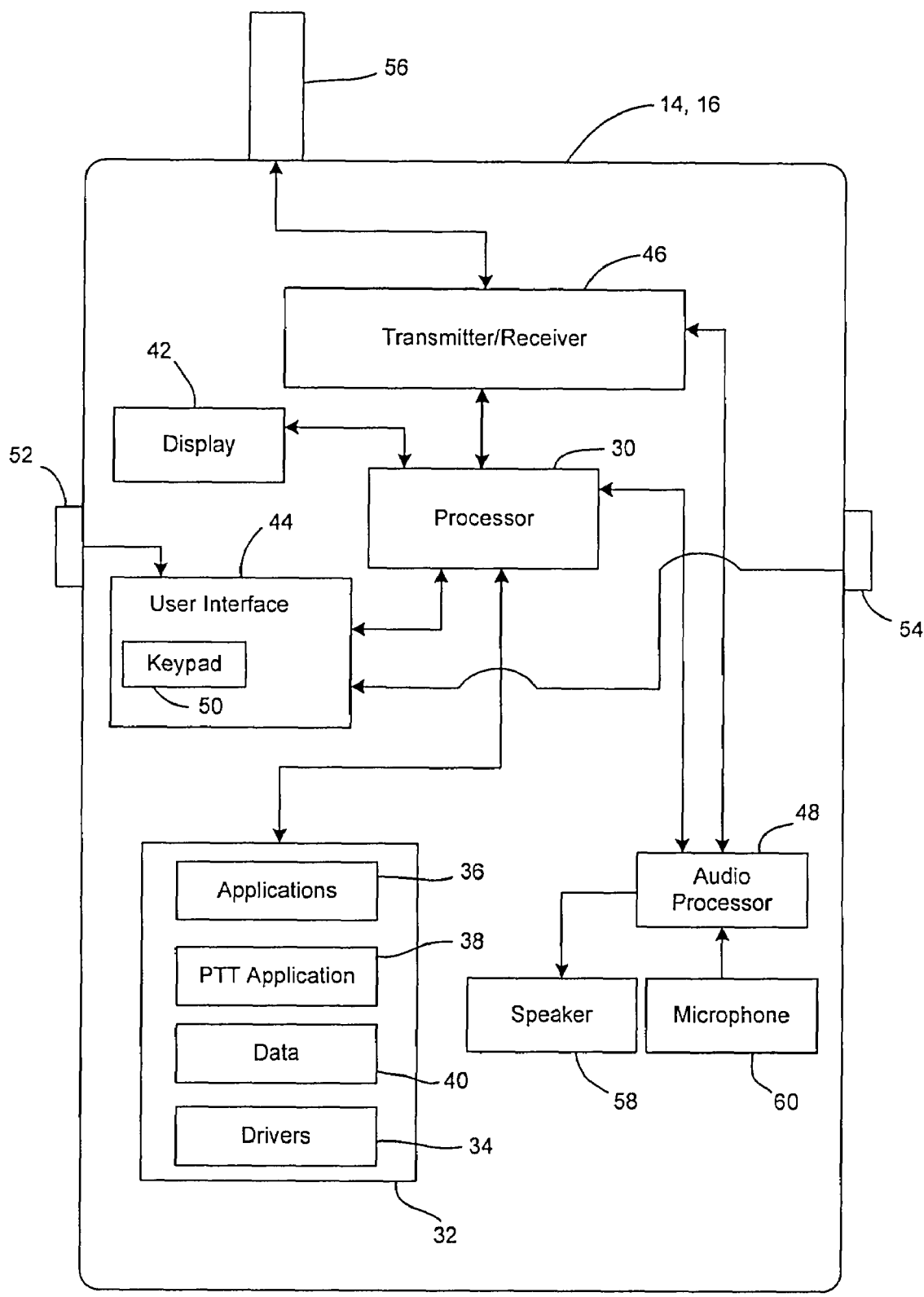
FIG. 2 is a diagrammatic illustration of a portable communication device in accordance with an embodiment of the present invention.

FIG. 2 represents a functional block diagram of a portable communication device 14, 16 in accordance with aspects of the present invention. The portable communication device 14, 16 includes a processor 30 for controlling the overall operation of the portable communication device. The processor 30 may be any commercially available or custom microprocessor. Memory 32 is operatively connected to the processor 30 for storing control programs and data used by the portable communication device. The memory 32 is representative of the overall hierarchy of memory devices containing software and data used to implement the functionality of the portable communication device in accordance with aspects of the present invention.

In the illustrated embodiment, memory 32 stores device drivers 34, e.g., I/O device drivers, application programs, indicated generally by reference numeral 36 generally, including a push-to-talk (PTT) application program 38 (also referred to as a PTT processor), and application program data 40. The I/O device drivers include software routines that are accessed through the processor 30 (or by an operating system (not shown) stored in memory 32) by the application programs 36, including the PTT application program 38, to communicate with devices such as the display 42 and other input/output ports.

The application programs 36, including the PTT application program 38, comprise programs that implement various features of the portable communication device 14, 16, such as e-mail, Internet access, contact manager and the like. As is discussed more fully below, the PTT application program 38 comprises a program that facilitates engaging in PTT communications, including triggering or otherwise performing one or more secondary actions while in control of the floor during a PTT communications session.

A person having ordinary skill in the art of computer programming, and specifically in applications programming for mobile phones, will consider it obvious in view of the description provided herein how to program a mobile phone to operate and carry out the functions described herein with respect to the PTT application program 38 (and any interfacing between the PTT application program 38 and other application programs 36 present on the mobile phone). Accordingly, details as to specific programming code have been left out for the sake of brevity. Also, while the PTT communications functionality, including the initiation or performance of a secondary action during a PTT session, is carried out via the processor and PTT application program 38 (alone or in conjunction with other application programs) in memory 32 in accordance with aspects of the invention, such function could also be carried out via dedicated hardware, firmware, software or combinations thereof without departing from the scope of the present invention.

With continued reference to FIG. 2, the processor 30 interfaces with the display 42, a user interface unit 44, a transmitter/receiver 46 (often referred to as a transceiver) and audio processing circuits, such as an audio processor 48, e.g., an audio processing circuit. In the illustrated embodiment, the user interface unit 44 includes or is operatively coupled to a keypad 50, a primary PTT actuator 52 and a secondary PTT actuator 54. While the primary PTT actuator 52 and the secondary PTT actuator 54 are illustrated as separate and dedicated user interface buttons, it will be appreciated that other existing buttons or keys on the mobile phone, e.g., one or more of the keys within the keypad 50 (so-called "soft keys"), may be employed to provide the functionality that is described herein as being connected to the primary PTT actuator and the secondary PTT actuator. In other words, the present invention is not intended to be limited to any particular configuration or geometry of PTT actuators.

The display 42, keypad 50 and the primary and secondary PTT actuators 52 and 54 provide a user interface that allows the user to interact with the mobile phone 14, 16. For example, keypad 50 allows the user to dial numbers, enter commands and data, and select options. The display 42 allows the user to view a variety of information, such as dialed digits, stored information, and output from various applications, including the PTT application program 38. As is discussed more fully below, the primary PTT actuator 52 allows a user to initiate a PTT session, e.g., inviting one or more other users to participate in a PTT communications session, and/or take control of the floor for speaking during the PTT communications session. The secondary PTT actuator 54 allows a user to trigger or otherwise perform a secondary action while having control of the floor during a PTT communications session.

An antenna 56 is coupled to the transmitter/receiver 46 such that the transmitter/receiver 46 transmits and receives signals via the antenna 52, as is conventional. The portable communication device 14, 16 includes an audio processor 48 for processing the audio signal transmitted by and received from the transmitter/receiver 46. Coupled to the audio processor 48 are a speaker 58 and microphone 60, which enable a user to listen and speak via the portable communication device.

Figure 3:
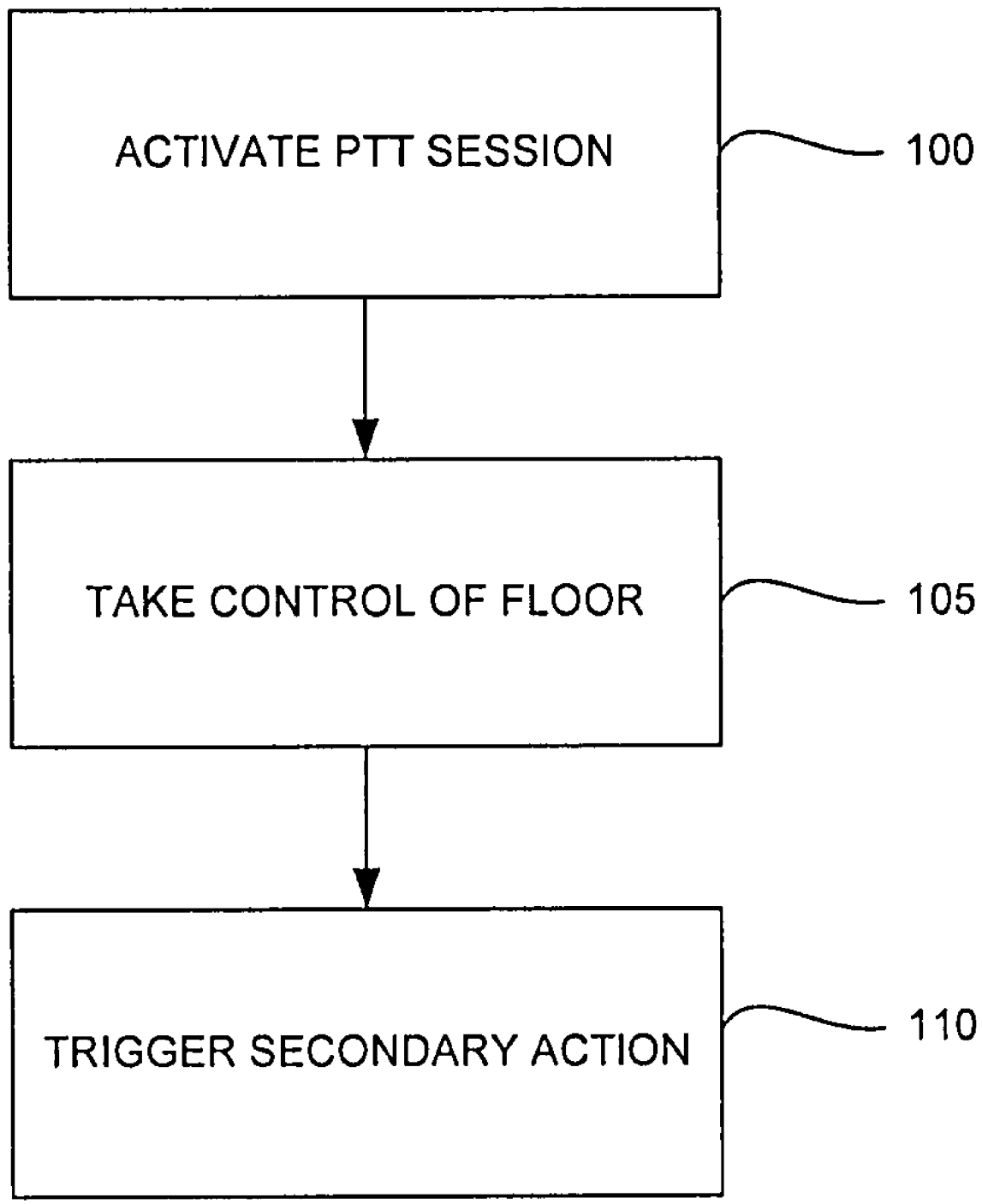
FIG. 3 is a flow chart or diagram representing the relevant operation of a portable communication device in accordance with an embodiment of the present invention.
Figure 4:
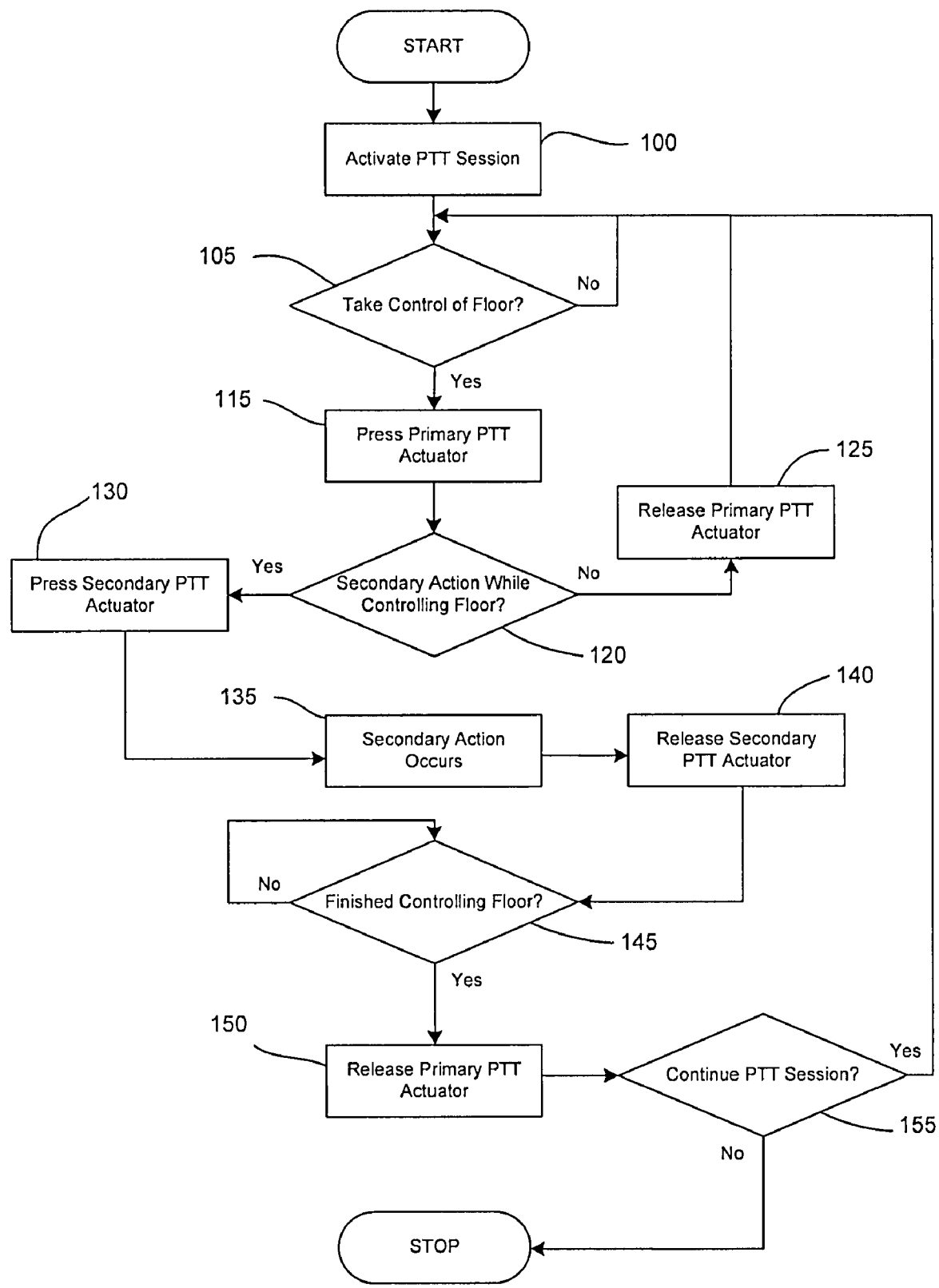
FIG. 4 is a flow chart or diagram representing the relevant operation of a portable communication device in accordance with an embodiment of the present invention.

While for purposes of simplicity of explanation, the flow charts or diagrams in FIG. 3 and FIG. 4 include a series of steps or functional blocks that represent one or more aspects of the relevant operation of the portable communication device 14, 16, it is to be understood and appreciated that aspects of the present invention are not limited to the order of steps or functional blocks, as some steps or functional blocks may, in accordance with aspects of the present invention, occur in different orders and/or concurrently with other steps or functional blocks from that shown and described herein. Moreover, not all illustrated steps or functional blocks of aspects of relevant operation may be required to implement a methodology in accordance with an aspect of the invention. Furthermore, additional steps or functional blocks of aspects of relevant operation may be added without departing from the scope of the present invention.

Turning now to FIG. 3, a method of push-to-talk (PTT) operations or functionality begins at functional block 100 where the mobile phone activates a PTT session. Activation of a PTT session may include transmitting an activation request, e.g., in response to a user pressing the primary PTT actuator 52, in response to a preset audible signal, in response to a preset movement or pressure or the like, to the PTT communication server. The PTT communication server verifies that a PTT communication channel is available, and then assigns the channel to the requesting mobile phone. Any message provided by the user of the requesting mobile phone is received by the PTT communication server and relayed to each receiving or invited mobile phone. Alternatively, activating a PTT session may include accepting an invitation from the requesting mobile phone to participate in a PTT communication session.

Once a PTT communication session is established between at least two mobile phones, only one party at a time may speak or otherwise transmit data. This is accomplished by one user pressing and holding a PTT actuator, e.g., the first PTT actuator, (also referred to as taking control of the floor). It will be appreciated that floor control is granted or otherwise established by the controlling PTT communication server. A user may continue to speak while the user has control of the floor. When the user is finished speaking, the user may release the PTT actuator, e.g., the first PTT actuator, thereby relinquishing control of the floor so that another participant in the PTT communication session may speak after taking control of the floor. At functional block 105, one mobile phone takes control of the floor, e.g., by transmitting the appropriate control signal to the PTT communication server in response to the user of the mobile phone pressing and holding a PTT actuator, e.g., the first PTT actuator 52.

Once floor control has been established, at functional block 1 10, the user may trigger a secondary action, e.g., by pressing and releasing the second PTT actuator 54 while continuing to hold the first PTT actuator 52. By pressing the second PTT actuator 54 while having control of the floor, the user signals the mobile phone to trigger a secondary action. In one embodiment, the secondary action includes transmitting an item of media content to one or more of the other users participating in the PTT communication session. The term "media content" as used herein includes, but is not limited to, a pre-recorded video clip, a pre-recorded image, a pre-recorded audio clip or song, an image, video or audio recorded/ captured by the mobile phone, e.g., a picture or a video taken using a camera within the mobile phone or a sound recorded using a microphone within the mobile phone, any data file or the like.

It will be appreciated that triggering a secondary action can include more than simply transmitting an item of media content. Triggering a secondary action can include triggering any action driven by any other application on the mobile phone, e.g., any other application program with which the PTT application program may interface, e.g., sending an email message, sending an IP multimedia system (IMS) message (including establishing an IP session with the remote device, and using SIP to communication a message), launching a request to determine the location of the triggering mobile phone or a remote PTT device, sending a data file from a worksite, sending a software update and the like. In triggering an action driven by another application program on the mobile phone, the PTT application program interfaces with one or more application programs on the phone, e.g., a video share application, a music share application, an image share application, a data share application or the like.

Referring now to FIG. 4, an exemplary embodiment of a method of PTT operations is provided. The method begins at functional block 100 where a mobile phone, e.g., in response to a user pressing the primary PTT actuator, activates a PTT session. As is described above with reference to FIG. 3, activating a PTT session may include transmitting an activation request or, alternatively, accepting an invitation from a requesting mobile phone to participate in a PTT communication session. Once a PTT communication session is established between at least two mobile phones, any participant in the PTT communication session has the option of taking control of the floor (functional block 105). As described above, only one participant in the PTT communication session may have control of the floor at any one time. At functional block 115, if a user desires to take control of the floor, the user can press and hold the primary PTT actuator (or some other PTT actuator, dedicated or otherwise). As described above, upon pressing and holding the primary PTT actuator (and upon floor grant by the controlling PTT communication server), the user will have control of the floor until the user releases the primary PTT actuator.

While in control of the floor, the user in control of the floor has the option to perform a secondary action while controlling the floor (functional block 120). If the user does not wish to perform a secondary action while controlling the floor, the user may release the primary PTT actuator (at functional block 125), thereby releasing control of the floor, and allowing another user participating in the PTT communication session to take control of the floor.

At functional block 130, if the user desires to trigger or otherwise initiate a secondary action while controlling the floor, the user may trigger the secondary action, e.g., by pressing the secondary PTT actuator. At functional block 135, the secondary action will be triggered or otherwise will occur in response to the user triggering the second action (functional block 130). As is described above, a user triggering a secondary action will command the mobile phone to perform the secondary action, e.g., by way of the PTT application alone or interfacing with one or more other application programs loaded or otherwise running on the mobile phone.

As described above, a variety of secondary actions are contemplated within the scope of the present invention. In one embodiment, the secondary action includes transmitting an item of media content to one or more of the other users participating in the PTT communication session. The term "media content" as used herein, includes, but is not limited to, a pre-recorded video clip, a pre-recorded image, a pre-recorded audio clip or song, an image, video or audio recorded by the mobile phone, e.g., a picture or a video taken using a camera within the mobile phone or a sound recorded using a microphone within the mobile phone, any data file or the like. In addition, as described above, triggering a secondary action may include the triggering of any other application program loaded or otherwise running on the mobile phone to take an action in accordance with or otherwise perform the functionality associated with the specific application program being triggered.

At functional block 140, after triggering and performance of the desired secondary action, the user may release the secondary PTT actuator (alternatively, the secondary action is triggered upon release of the secondary PTT actuator). At functional block 145, the user can decide whether he/she is finished controlling the floor. If the user is not finished controlling the floor, the user may continue to hold the primary PTT actuator, and may speak or trigger an additional secondary action. If the user no longer wishes to control the floor, at functional block 150, the user may release the primary PTT actuator, and the user may decide whether or not to continue the PTT communication session (functional block 155). Of course, if the user no longer wishes to continue the PTT communication session, the user may end the PTT communication session by using the appropriate actuator or key, e.g., a soft key, on the mobile phone to end the PTT communication session. Alternatively, the user may release the primary PTT actuator and continue the PTT communication session with the options of re-taking control of the floor, if desired, or waiting to receive voice communication and/or data transfer from other participants in the PTT communication session.

It will be appreciated that a mobile phone having the capability of triggering one or more secondary actions while controlling the floor during a PTT communication session provides the user with additional user controls and/or interface options, which may be employed in a variety of possible applications. By way of example, and in no way limiting the embodiments described herein, the user may wish to show something, such as a diagram, image or video clip, to others participating in a group PTT communication session. Use of the secondary PTT actuator will allow the user to send or otherwise transmit the desired object to a group while describing or otherwise discussing the object sent by way of the secondary PTT actuator. Another possible application allows a user to engage in a PTT communication session with a friend, and ask the friend for directions by triggering a secondary action of obtaining and showing a video clip of a location from which the user desires directions, e.g., "I am here on Piccadilly Court looking North, I think, see," (triggering a secondary action of showing a video of where the user is facing). In another exemplary application, a user who is participating in a group PTT communication session, may send an image to each participant in the group PTT communication session, and ask for assistance from someone who may be familiar with the image or file transferred during the group PTT communication session. Artisans will appreciate that the method and device described herein with reference to exemplary embodiments, will lend itself of a variety of other applications that are contemplated to be within the scope of the present invention.

As will be appreciated by one of skill in the art, computer program elements and/or circuitry elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A portable communication device comprising:
a first push-to-talk (PTT) actuator;
a second PTT actuator; and
a PTT processor in operative communication with the first PTT actuator and the second PTT actuator, the PTT processor:
  requesting control of a PTT communication floor in response to user actuation of the first PTT actuator; and
  triggering a secondary action to be performed while having control of the PTT communication floor in response to user actuation of the second PTT actuator.

2. The portable communication device according to claim 1, wherein the PTT processor interfaces with a media content sharing application program to transmit selected media content to a second portable communication device.

3. The portable communication device according to claim 1, wherein the PTT processor releases control of the PTT communication floor in response to user release of the first PTT actuator.

4. The portable communication device according to claim 1, wherein the first PTT actuator is located on a first side of the portable communication device, and the second PTT actuator is located on a second side of the portable communication device.

5. The portable communication device according to claim 1, wherein the portable communication device is a mobile telephone.

6. The portable communication device according to claim 1, wherein triggering a secondary action includes interfacing with an application program on the portable communication device and requesting the application program to perform a desired action.

7. The portable communication device according to claim 6, wherein the application program includes sharing image files, video files and/or audio files.

8. The portable communication device according to claim 6, wherein triggering a secondary action includes requesting transmission of an IP multimedia subsystem (IMS) message.

9. A portable communication device comprising:
a first push-to-talk (PTT) actuator;
a second PTT actuator; and
a PTT processor in operative communication with the first PTT actuator and the second PTT actuator, the PTT processor:
  requesting control of a PTT communication floor in response to user actuation of the first PTT actuator; and
  triggering a secondary action to be performed while having control of the PTT communication floor in response to user actuation of the second PTT actuator, wherein the secondary action includes transmitting a user-selected item of media content to at least one other portable communication device participating in a PTT communication session.

10. The portable communication device according to claim 9, wherein the media content includes an image, a video clip, an audio clip and/or a data file.

11. A program stored on a memory, the program being suitable for use in a portable communication device, wherein when the program is loaded in the memory in the portable communication device and executed causes the portable communication device to:
activate a push-to-talk (PTT) session;
request control of a PTT communication floor in response to user actuation of a primary actuator; and
trigger a secondary action to be performed while having control of the PTT communication floor in response to user actuation of a secondary PTT actuator.

12. The program according to claim 11, wherein the portable communication device is a mobile phone.

13. The program according to claim 11, wherein the secondary action is transmitting a user-selected item of media content to at least one other portable communication device.

14. The program according to claim 13, wherein the item of media content includes an image, a video clip, an audio clip and/or a data file.

* * * * *